F. X. MOERK.
PERPETUAL CALENDAR.
APPLICATION FILED APR. 13, 1917.

1,266,610.

Patented May 21, 1918.
2 SHEETS—SHEET 2.

WITNESS:

INVENTOR
Frank X. Moerk
BY
Frank S. Busser
ATTORNEY.

UNITED STATES PATENT OFFICE.

FRANK X. MOERK, OF PHILADELPHIA, PENNSYLVANIA.

PERPETUAL CALENDAR.

1,266,610.  Specification of Letters Patent.  Patented May 21, 1918.

Application filed April 13, 1917. Serial No. 161,698.

*To all whom it may concern:*

Be it known that I, FRANK X. MOERK, a citizen of the United States, residing at Oak Lane, city and county of Philadelphia, and State of Pennsylvania, have invented a new and useful Improvement in Perpetual Calendars, of which the following is a full, clear, and exact description, reference being had to the accompanying drawings, which form a part of this specification.

My invention relates to calendars and especially to that form known as a "perpetual" calendar, namely: one which not only forms a calendar of the usual form for the current year, but also is readily adaptable for an indefinite number of years both in the past and in the future.

The object of my invention is to provide such a calendar, which shall present calendars of the twelve months of the year, visible at one time on its face, and which shall be capable of change, with a minimum of mental and physical effort, so that said monthly calendar may read correctly for any common year or leap year, past or future. Another object of the invention is to simplify the construction of the calendar and more particularly to effect the results sought by the use of but one face of each of two relatively movable cards.

A preferred embodiment of my invention is shown in the accompanying drawings, in which:—

Figures 2, 3:
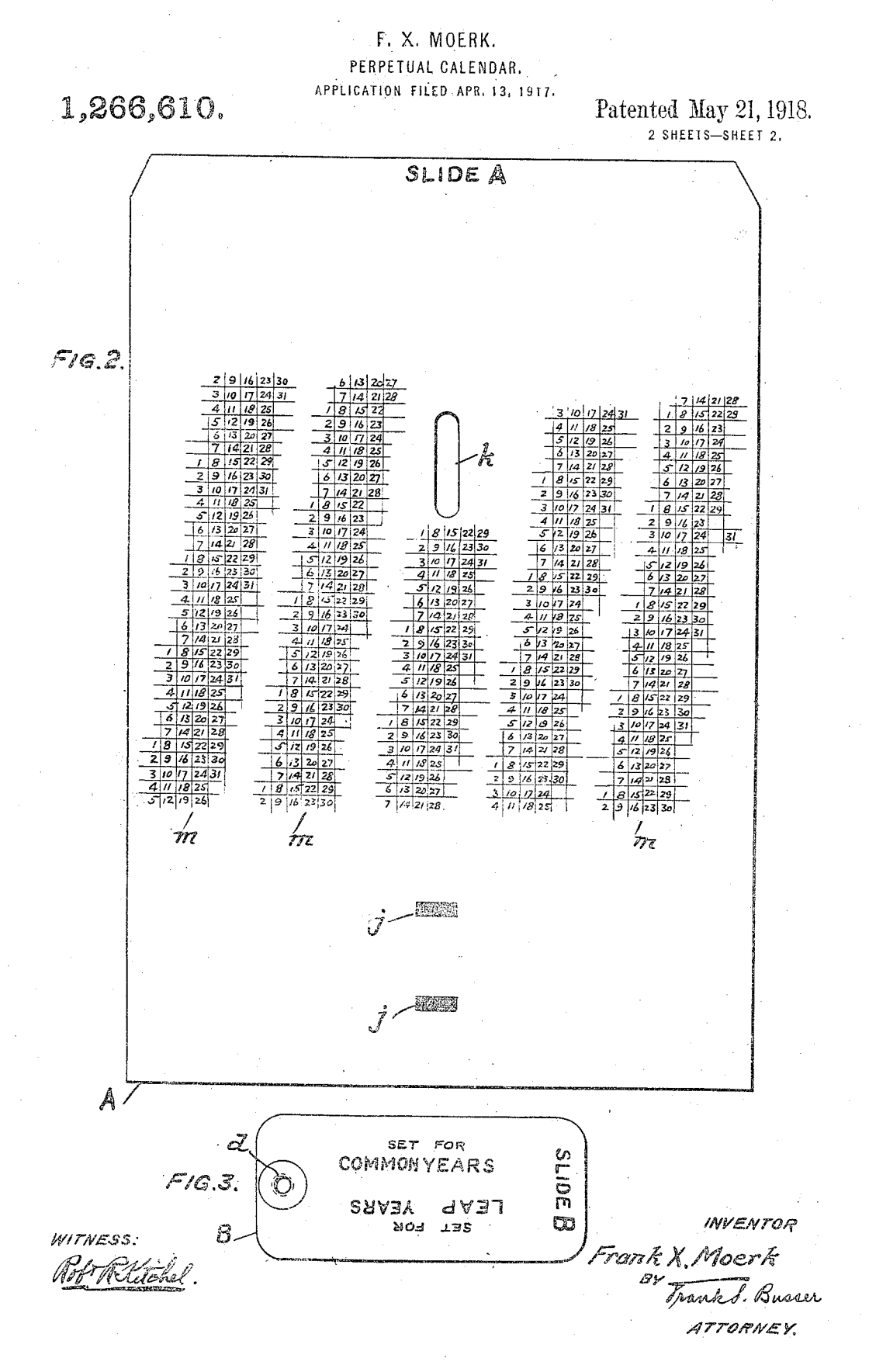

Fig. 2 represents the face of the interior sliding member.

Fig. 3 represents the exterior slide or leap year flap.

Figure 1:
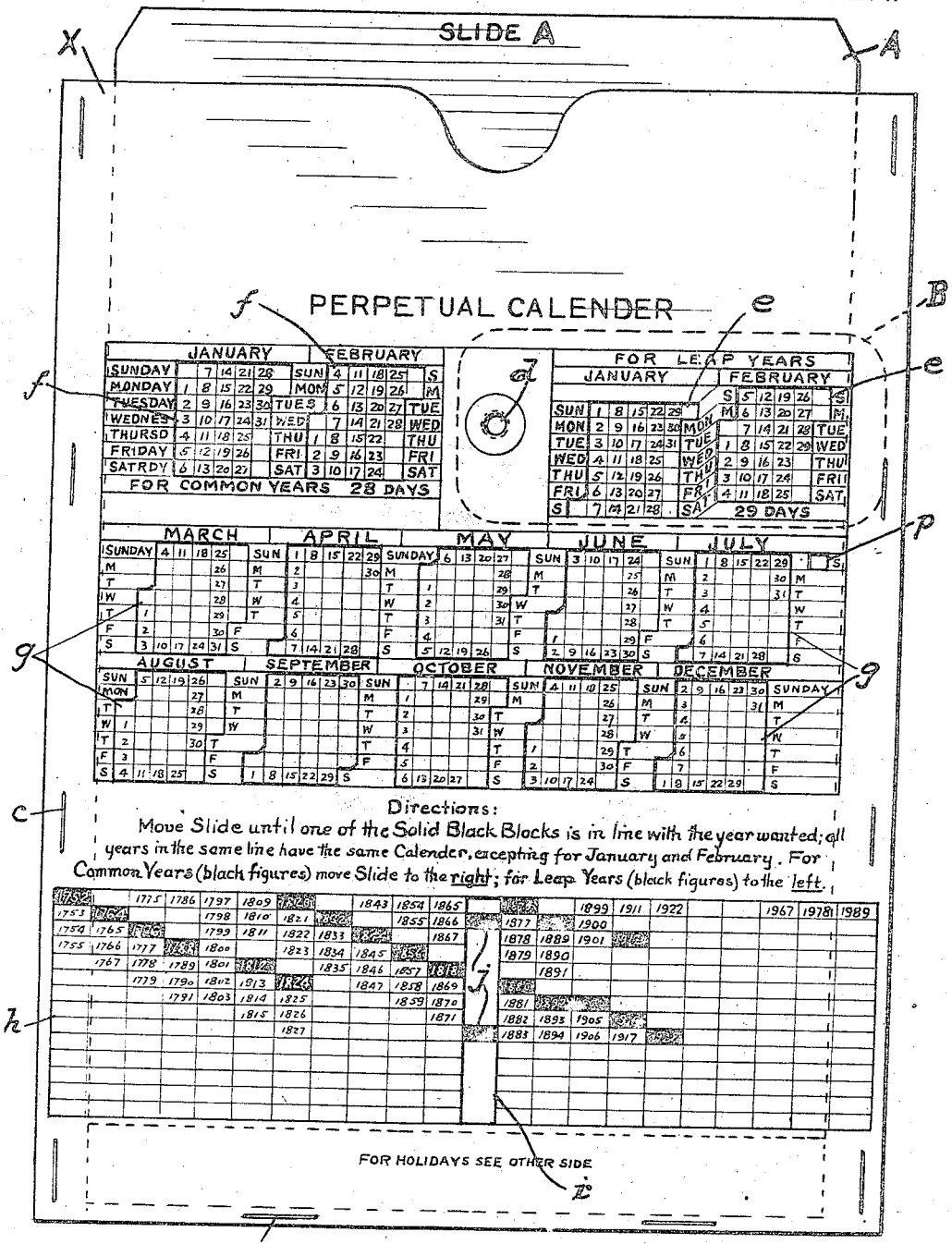
Figure 1 is a front or face view of my improved calendar shown as set for the present year.

The mechanical construction of my calendar is very simple and, as shown, consists of the stationary enveloping member $x$, in which is movable the slide $a$ and on the front of which is movable the slide or flap $b$. The enveloping member is formed of similar front and back sheets fastened together along both sides and the bottom as at $c$. Within this envelop is slidably mounted the member $a$ to move up and down vertically.

An unusual feature of the front face of the calendar will be immediately noticed, in that there are fourteen monthly openings therethrough for the twelve months of the year. This is brought about by the provision of separate openings for January and February of leap years as well as January and February of common years, all the rest of the months remaining the same for both.

Down the edges of these openings, on the strips of the front sheet of member $x$ remaining therebetween, are arranged the days of the week in regular order from Sunday to Saturday. Each of the openings is headed by the name of a month, in order from January to December, January and February being duplicated as stated above. Through all of these openings appear certain portions of slide $a$, containing numbers in calendar form, and said openings are of such size and shape as to always permit the correct number of days for each month to be seen on slide $a$, in any of its positions.

The leap year flap $b$ is pivotally connected to the enveloping member $x$, as by the eye $d$. On this as a center, member $b$ may be turned from one side to the other, covering two of the above mentioned fourteen openings in member $x$, and leaving to view an entire twelve month, either common or leap year. As indicated by dotted lines in Fig. 1, member $b$ is turned to the right side, covering openings $e$ of January and February for leap years, and reading to the observer "Set for common years." This is as it should be for the year of grace 1917. Similarly if the calendar is to be set for a leap year 1916 for instance, member $b$ would be turned around its pivot $d$ until it covered over the January and February openings $f$ on the left side, when the observer would read upon member $b$ "Set for leap years" and calendars for January and February containing twenty-nine days, are visible to the right, calendars for the remaining ten months appearing beneath, in two rows of five months each. This arrangement brings August directly beneath March, and it is to be noted that both these months contain the same number of days: thirty-one. Likewise, September comes beneath April, and they have the same number of days: thirty. It will be seen that the rest of the months in these two rows fulfil the same relation to each other, and this fact I have utilized to add to the completeness and simpleness of my calendar.

For instance, one of the numbers 31 will appear through both the month openings for March and for August as the slide *a* is set for different years. This could not be were the months of not the same length.

The lower portion of the front face of member *x* comprises a table *h* of years, and may be as extensive as desired or practical, representing the scope of the calendar in years past and future. In the form depicted in Fig. 1 provision has been made to cover 250 years, and the leap years are distinguished by appearing in white figures on a black ground.

Intermediate in this year table is a cutaway column, forming an opening *i*, through which is visible a distinguishing mark or marks *j*. To set the calendar to give a correct reading for any year provided for, it is only necessary to manipulate slide *a* from the top until mark *j* comes opposite the horizontal line in the year table *h* containing the year desired, flap *b* being turned as before described to suit either common or leap year.

The arrangement of the month openings *e*, *f*, *g* in member *x*, and their relative spacing, is such that the day figures upon the face of slide *a* form continuous columns *m*. Moreover, the figures in each column are simply progressive, running 1, 2, 3, 4, up to 28, 29, 30 or 31 as the case may be. And the figures next to each other in the rows formed by the adjoining columns differ from each other in every case by 7, the number of days in a week.

To allow of this simple and systematic arrangement of the numbers upon slide *a* necessitates certain irregularities in the outline of the month openings *e*, *f*, *g*, but this militates in no wise against the clearness and readability of the calendar.

To cover all possible years and combinations, it is not necessary to move slide *a* more than the vertical distance of seven horizontal lines of figures. Columns *m* on slide *a* are extended beyond what will show at any time through openings *e*, *f*, *g* by the distance therefrom of six horizontal lines. To provide a stop for the movement of slide *a*, in both an upward and downward direction, the pivot eye *d* of flap *b* is extended through from the front to the back of the calendar, and slot *k* provided in slide *a* therefor, of just sufficient length to allow slide *a* to be moved the seven vertical lines necessary.

Pivot eye *d* thus connects the front and back sheets of the envelop member *x*, and adds thereby to the stiffness and durability of the calendar structure.

It will be noticed that there is a number 31, standing separated from the others, on the right hand side of column *m* on slide *a*. This number comes in the month of July only and is offset as shown to prevent its appearing in the opening *e* for February in the upper positions of slide *a*. An auxiliary opening *p* is provided for this number contiguous to the July opening in the face of member *x*.

Having now fully described my invention, what I desire to claim and protect by Letters Patent is:—

1. A calendar comprising a card having two pairs of perforations, one pair corresponding to the months of January and February of common years and the other pair corresponding to the months of January and February of leap years, and ten perforations corresponding to the remaining months of any year, and a slidable sheet provided with numerals indicative of days of months and alining with said perforations and arranged, when the slidable sheet is moved into different positions, to exhibit, in the several perforations, different combinations of numerals corresponding to the calendars of different common and leap years.

2. A calendar comprising the elements set forth in claim 1, and comprising also, on the first named card, rows of spaces corresponding to different series of years and year numerals arranged on said spaces, and an indicating device on the movable card adapted to be registered with any row of spaces, whereby the calendar for any year in such row of spaces will be indicated in the ten perforations above named and in one pair of the two pairs of perforations dependent upon whether the last named year is a leap year or a common year.

3. A calendar comprising the elements set forth in claim 1 and comprising also movable means adapted to conceal either of the said two pairs of perforations and the numbers registering therewith, thereby enabling the calendar to be adjusted to indicate certain of one or the other kind of years.

4. A calendar comprising the elements set forth in claims 1, 2 and 3.

5. A calendar comprising a card having ten perforations arranged to form five rows of two each and corresponding to ten months of the year and four perforations alining respectively with four of said rows, two of said four perforations corresponding to the months of January and February of common years and the other two of said four perforations corresponding to the months of January and February of leap years, and a slidable card having five series of numerals alining with said five rows of spaces and adapted to be moved into different positions to exhibit in the several perforations, different combinations of numerals corresponding to the calendars of different common and leap years.

6. A calendar comprising a card having at least seven rows of spaces provided with year numerals and perforations exceeding in number the months of a year, and a slidable card adapted to be registered with any one of said rows of year numerals, said slidable card having numerals alining with said perforations and adapted, when the movable card registers with any row of year numerals, to exhibit, in one combination of twelve of said perforations, numerals affording a calendar corresponding to the common years of the last named row of year numerals, and in another combination of twelve of said perforations, numerals affording a calendar corresponding to the leap years of the last named row of year numerals.

7. A calendar comprising a card having ten perforations corresponding to the last ten months of a year and arranged in five rows, the perforations of the first, third and fifth rows corresponding to the six of said months having thirty-one days and the perforations of the second and fourth rows corresponding to the four of said months having only thirty days, two perforations, corresponding to the months of January and February of one kind of years, alining respectively with the first and second rows, and two perforations, corresponding to the months of January and February of the other kind of years, alining respectively with the fourth and fifth rows, and a movable card having five rows of numerals, indicative of days of the month, alining with the five rows of perforations, the last named numerals being arranged to exhibit, in the different perforations, different combinations of numerals, each of which combinations corresponds to the calendars of a given series of leap years and common years.

8. A calendar comprising a card having perforations corresponding to months, and a sheet provided with numerals indicative of days of months and arranged to slide relatively to said card, the distance between adjacent perforations measured in the direction of said sliding movement being substantially less than the width of any of said spaces measured in the same direction, the day numerals being so arranged that certain of such numerals register with a plurality of such adjacent perforations in different positions of said sheet.

In testimony of which invention, I have hereunto set my hand, at Philadelphia, on this 12th day of April, 1917.

FRANK X. MOERK.